United States Patent
Hwang et al.

(10) Patent No.: US 8,482,683 B2
(45) Date of Patent: Jul. 9, 2013

(54) VEHICLE INSIDE MIRROR DEVICE FOR DISPLAYING IMAGE

(75) Inventors: Hyok-Joo Hwang, Bucheon (KR); Jin Gee Choi, Buncheon-si Gyeongg (KR); Soo Jin Lim, Seoul (KR)

(73) Assignee: SMR Patents S.a.r.l., Luxembourg (LU)

( * ) Notice: Subject to any disclaimer, the term of this patent is extended or adjusted under 35 U.S.C. 154(b) by 578 days.

(21) Appl. No.: 12/780,887

(22) Filed: May 15, 2010

(65) Prior Publication Data
US 2010/0289995 A1 Nov. 18, 2010

(30) Foreign Application Priority Data
May 15, 2009 (KR) .......... 10-2009-0042649

(51) Int. Cl.
*G02F 1/1335* (2006.01)
(52) U.S. Cl.
USPC ............... 349/11; 349/5
(58) Field of Classification Search
USPC .......... 349/5, 11, 58, 149
See application file for complete search history.

(56) References Cited

U.S. PATENT DOCUMENTS

| 7,338,177 | B2 | 3/2008 | Lynam |
| 2005/0134983 | A1 | 6/2005 | Lynam |
| 2009/0015736 | A1* | 1/2009 | Weller et al. .......... 349/11 |

FOREIGN PATENT DOCUMENTS

| KR | 1020060038856 | 5/2006 |
| KR | 0663930 | 1/2007 |

* cited by examiner

*Primary Examiner* — Edward Glick
*Assistant Examiner* — David Chung
(74) *Attorney, Agent, or Firm* — Reising Ethington PC

(57) ABSTRACT

A vehicle inside mirror device for displaying an image, which can obtain an enhanced mirror function of a prismatic glass caused by a black film provided at a rear side of a prismatic glass and has a relatively simple structure made by forming directly a transflective layer on a rear surface of a prismatic glass without using a substrate. The vehicle inside mirror device comprises a housing mounted in a passenger compartment of a vehicle; a prismatic glass provided on a front side of the housing and having a transparent transflective layer formed on a rear surface thereof; a black film provided at a rear side of the prismatic glass and having an opening formed on one side thereof; a liquid crystal display (LCD) module provided at a rear side of the opening of the black film; and a control circuit unit installed at a rear side of the LCD module.

7 Claims, 3 Drawing Sheets

VEHICLE INSIDE MIRROR DEVICE FOR DISPLAYING IMAGE

CROSS-REFERENCE TO RELATED APPLICATION

This application claims priority to and the benefit of Korean Patent Application No. 10-2009-0042649 filed on May 15, 2009 in the Korean Intellectual Property Office (KIPO), the entire content of which is hereby incorporated by reference.

BACKGROUND

1. Field of the Invention

Aspects of the present invention relate to a vehicle inside mirror device. More particularly, the invention relates to a vehicle inside mirror device for displaying an image, which can obtain an enhanced mirror function of a prismatic glass caused by a black film provided at a rear side of a prismatic glass. The inside mirror has a relatively simple structure made by forming directly a transflective layer on a rear surface of a prismatic glass without using a substrate.

2. Description of the Related Art

As performances of vehicle become more diversified, a rear image-acquisition device comprising a camera mounted to a rear portion of a vehicle and a display unit provided around a driver's seat has been widely utilized for viewing and verifying a rear side when a vehicle is traveled backward.

However, the above rear image-acquisition device has the problems that an additional display unit should be provided in a passenger compartment of the vehicle and the display unit is installed at a place where it is difficult for a driver to view.

In order to solve the above-mentioned problems, an inside mirror having the information displaying function for providing a convenience to a driver is disclosed in Korean Patent Laid Open publication No. 10-2006-0038856 (May 4, 2006) entitled "Vehicle inside mirror device capable of displaying information. In the above Korean Patent Laid Open publication, an OLED (organic light-emitting diode) display device is mounted to a conventional vehicle inside mirror having only light reflection function and a camera provided at a rear portion of the vehicle. A vehicle side mirror is connected to the OLED display device to display the accurate information on an existence and shape of object and to display the information on an object placed in the dead angle range, which can not be viewed by a side mirror of the vehicle, when the vehicle is travelling backward. In addition, the various kinds of multimedia equipments are connected to the inside mirror to display all the information on the inside mirror without providing an additional device.

Also, the technology for manufacturing a vehicle inside mirror in which one of VF, LED, OLED, LCD and the like is mounted to a rear surface of a prismatic glass is disclosed in U.S. Pat. No. 7,338,177 entitled "Mirror reflective element for a vehicle" and issued on Mar. 4, 2008.

However, since the above inside mirror comprises a transflective layer, a mirror function of the prism mirror becomes relatively lowered.

In addition, a substrate is not employed in the above inside mirror, and so a structure of the inside mirror is relatively complicated.

SUMMARY

The present invention is conceived to solve the above-mentioned drawbacks. It is an aspect of the present invention is to provide a vehicle inside mirror device for displaying an image, in which a black film is provided at a rear side of a prismatic glass to enhance a mirror function.

Also, it is another aspect of the present invention is to provide a vehicle inside mirror device for displaying an image, which has a relatively simple structure obtained by directly forming a transflective layer on a rear surface of a prismatic glass without using a substrate.

The vehicle inside mirror device for displaying an image according to one embodiment of the present invention comprises a housing mounted in a passenger compartment of a vehicle; a prismatic glass provided on a front side of the housing. The prismatic glass has a transparent transflective layer formed on a rear surface thereof; a black film provided at a rear side of the prismatic glass and having an opening formed on one side thereof; a liquid crystal display (LCD) module provided at a rear side of the opening of the black film; and a control circuit unit installed at a rear side of the LCD module.

It is preferable that the housing comprises a frame mounted to a front side thereof along an edge of the prismatic glass and a heat-radiating aperture formed thereon for radiating heat emitting from the LCD module and the control circuit unit to an outside thereof.

Here, the LCD module can have a front surface black in color to remove a difference in color between the black film and the LCD module exposed through the opening of the black film.

In addition, the LCD module may include a frame provided along an edge thereof to provide an electromagnetic interference (EMI) performance.

Preferably, the control circuit unit comprises a regulator electrically connected to a power source; an A/D convertor electrically connected to an illumination sensor and a camera. A microcontroller unit electrically is connected to the A/D converter. A backlight unit is connected to the regulator and the microcontroller unit and generates backlight. An EEPROM (electrically erasable and programmable read only memory) is electrically connected to the microcontroller unit and an interface; a LCD driver is electrically connected to the interface and has an output terminal connected to the LCD module.

Particularly, the micro control unit can calculate the luminance in a passenger compartment of the vehicle on the basis of the signal inputted from the illumination sensor and control a brightness of the light emitted from the backlight unit according to the calculating result. The brightness of the light emitted from the backlight unit becomes brighter than that of the light reflected from the transflective layer and the prismatic glass. Accordingly, even though the external light image is transmitted through the transflective layer into the passenger compartment, a viewer can view and recognize the image generated in and displayed on the LCD module and passed through the transflective layer.

In addition, it is preferable that the micro control unit controls the LCD module to display an image regarding the image data transmitted from the camera and a distance between the vehicle and an object placed at a rear side of the vehicle.

BRIEF DESCRIPTION OF THE DRAWINGS

The features and aspects of the present invention will be more apparent from the following detailed description in conjunction with the accompanying drawing, in which.

DETAILED DESCRIPTION OF THE EMBODIMENTS

Hereinafter, embodiments of the present invention will be described in detail with reference to the accompanying drawings.

Figure 1:
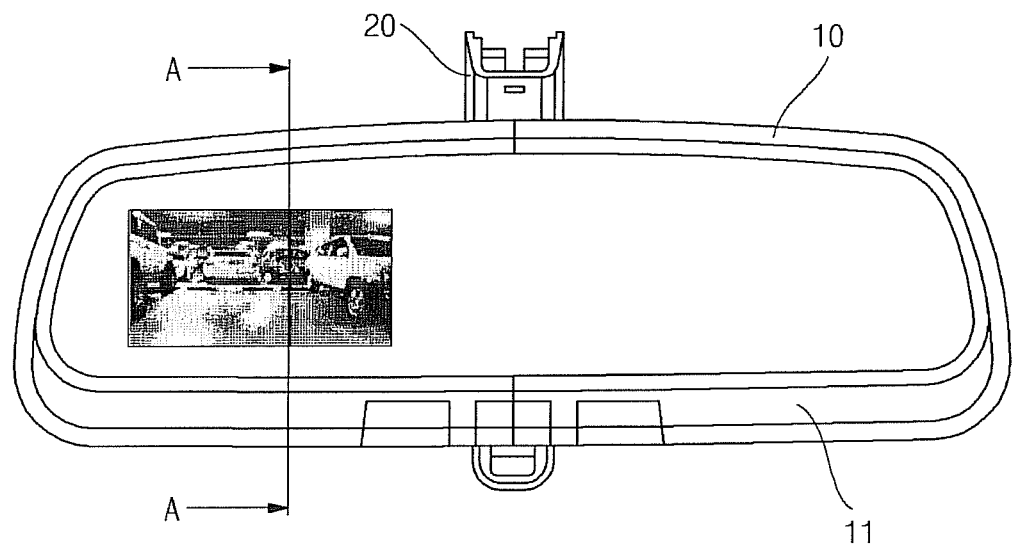
FIG. 1 is a front view of a vehicle inside mirror for displaying an image according to one embodiment of the present invention.
Figure 2:
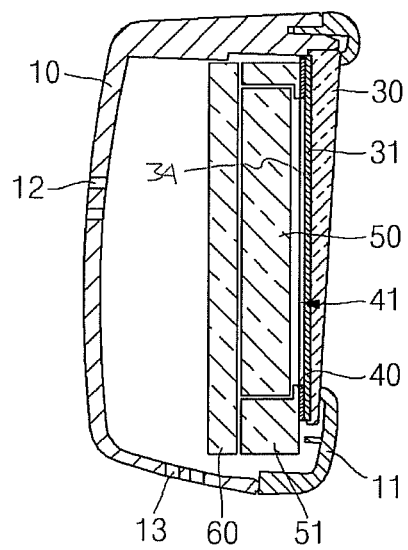
FIG. 2 is a cross-sectional view taken along the line A-A in FIG. 1.
Figure 3:
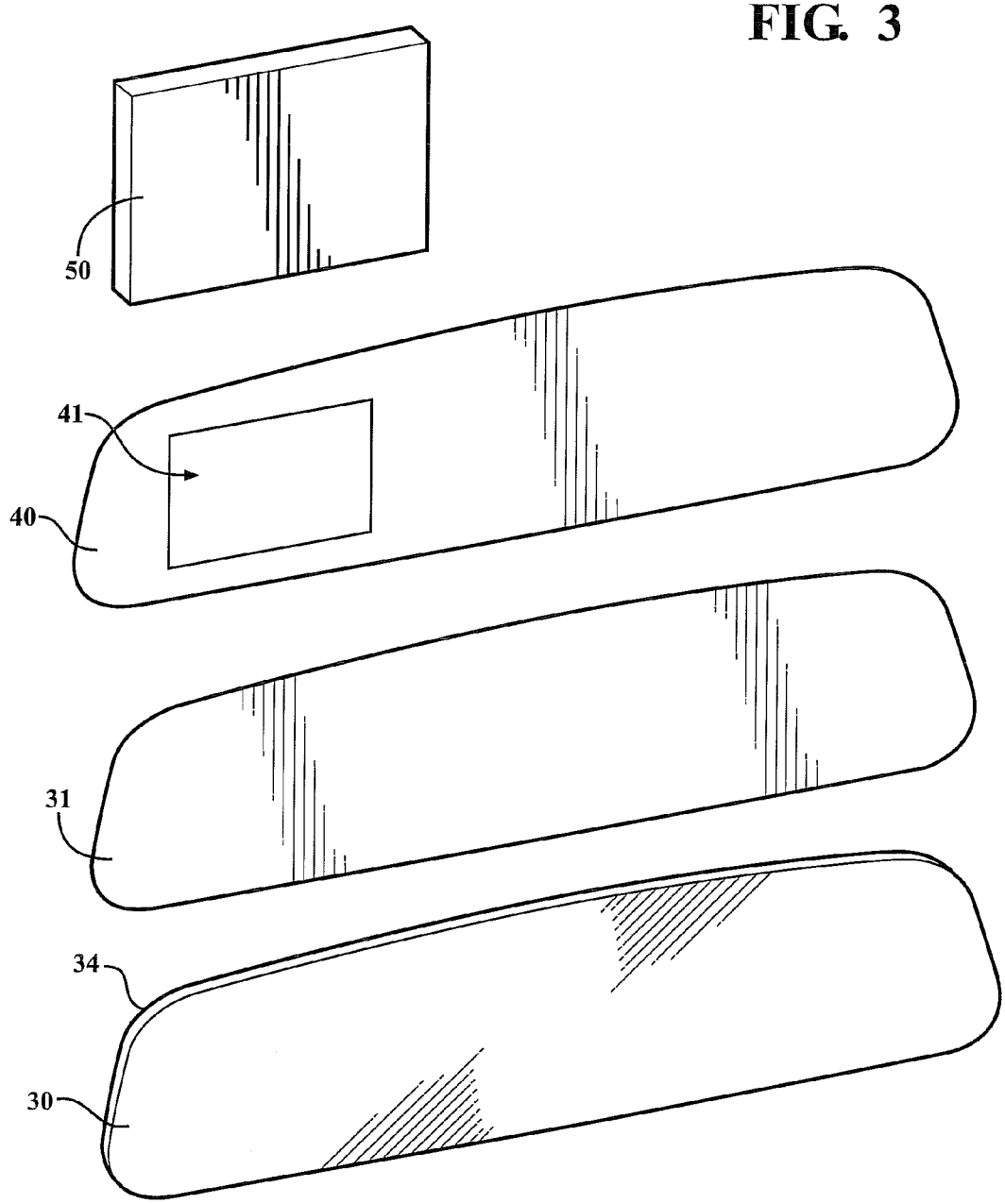
FIG. 3 is an exploded perspective view of one embodiment of the present invention.

As shown in FIG. 1 through FIG. 3, a vehicle inside mirror device for displaying an image according to one embodiment of the present invention includes a housing 10 mounted in a passenger compartment, a stay 20 connected to a rear surface of the housing 10 for mounting the housing 10 to a vehicle body. The housing includes a prismatic glass 30 provided on a front side of the housing 10 and having a transparent transflective layer 31 formed on a rear surface 34 of the prismatic glass 30. A black film 40 is provided at the rear side 34 the prismatic glass 30 and has an opening 41 formed at one side thereof. The transflective layer 31 is disposed between the black film 40 and the rear side 34. A liquid crystal display (LCD) module 50 is provided at a rear side of the opening 41 of the black film 40 and a control circuit unit 60 is installed at a rear side of the LCD module 50.

On a front side of the housing 10, a frame 11 is provided along an edge of the prismatic glass 30. In addition, heat-radiating apertures 12 and 13 are formed on rear portion and bottom portion, respectively, of the housing 10 for radiating heat emitting from the LCD module 50 and the control circuit unit 60 to an outside of the housing 10.

The transflective layer 31 formed on a rear surface 34 of the prismatic glass 30 is transparent and has a reflectivity of approximately 60% and a transmission of approximately 40% in the visible light wavelengths. In view of an optical constant and a durability of substance to be deposited, highly reflective mineral substance having a high reflective index and low reflective mineral substance having a low reflective index are selected from mineral substances indicated in the below table. The selected substances are deposited on the prismatic glass 30 to form the transflective layer 31 having a desired wavelength transmission/reflection.

TABLE

| Mineral substance | AlF$_3$ | TiO | SiO$_2$ | MgF$_2$ | Al$_2$O$_3$ | PbF$_2$ | CeF$_3$ | CeO$_2$ | HfO$_2$ | LaF$_3$ | NbF$_3$ |
|---|---|---|---|---|---|---|---|---|---|---|---|
| Reflective Index | 1.35 | 2.4 | 1.46 | 1.38 | 1.63 | 1.75 | 1.33 | 2.0 | 1.9 | 1.6 | 1.6 |

In other words, a multi-layered layer is formed on a rear surface of the prismatic glass 30 through a deposition process to change a reflectivity, a thickness, the number of layer of the layer, and so the light within a specific wavelength range can be penetrated, absorbed and reflected by the layer. In addition, in view of the desired reflectivity and transmission, substance to be deposited is selected and deposited repeatedly on a specific surface to form the layer having a thickness of several tens Å to several thousands Å. An e-beam evaporation process and a sputtering process can be performed as the above deposition process. In this embodiment, titanium oxide (TiO$_2$) and silicon oxide (SiO$_2$) are utilized as mineral substances for forming the transflective layer 31. The black film 40 is a black coat that covers the rear of the prismatic glass 30 so that the interior view of the rear view mirror is hidden. The black film 40 can be a black color only or a black plastic film. It is an advantage to use a taped black film for adhesion reasons.

The black film 40 enhances the performance of the transflective layer 31 for the relatively high level of transparency would arise shadow images for the viewer. This problem is solved by using the black film 40.

A front surface of the LCD module 50, which corresponds to the black film 40, has a black color which is the same as the color of the black film 40, and so a difference in color between the black film 40 and the LCD module 50 exposed through the opening 41 of the black film 40 is not generated. In addition, a LCD frame 51 is provided along an edge of the LCD module 50 to provide an electromagnetic interference (EMI) performance.

Figure 4:
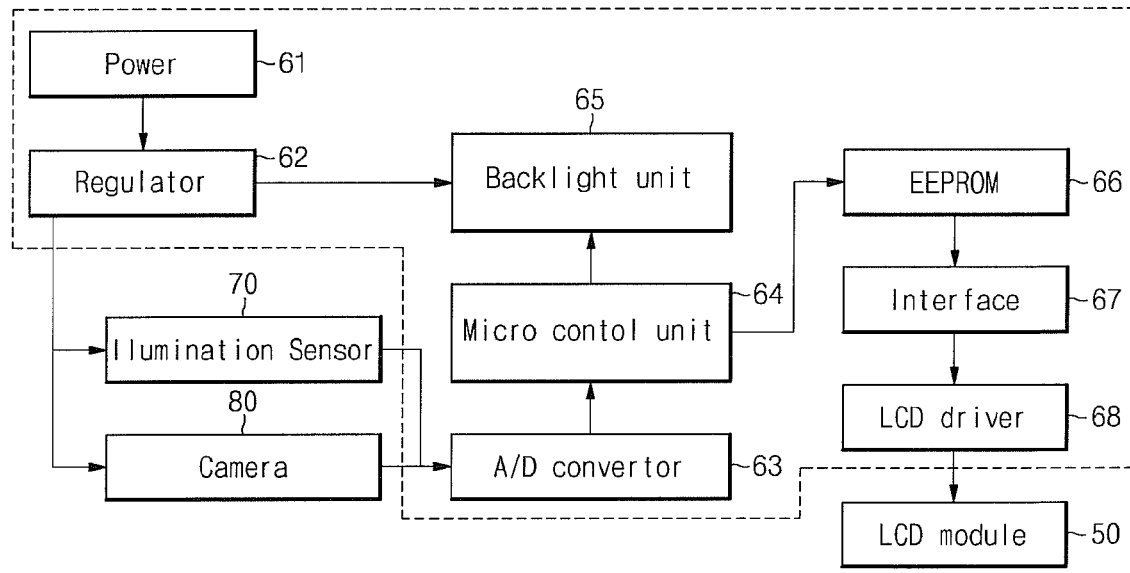
FIG. 4 is a block diagram of a control circuit unit of a vehicle inside mirror device for displaying an image according to one embodiment of the present invention.

FIG. 4 is a block diagram of the control circuit unit of the vehicle inside mirror device for displaying an image according to one embodiment of the present invention.

As shown in FIG. 4, the control circuit unit 60 of the vehicle inside mirror device for displaying an image according to one embodiment of the present invention comprises a regulator 62 electrically connected to a power source 61. An A/D convertor 63 is electrically connected to an illumination sensor 70 and a camera 80, a microcontroller unit 64 is electrically connected to the A/D convertor 63. A backlight unit 65 is connected to the regulator 62 and the microcontroller unit 64 and generates backlight. An EEPROM (electrically erasable and programmable read only memory) 66 is electrically connected to the microcontroller unit 64 and an interface 67. A LCD driver 68 is electrically connected to the interface 67 and has an output terminal connected to the LCD module 50.

In this embodiment of the present invention, although the camera 80 is electrically connected to the control circuit unit 60, the present invention is not limited thereto. In other words, various image/information receiving/storage equipments such as an ETCS (electronic toll collection system) module, a vehicle navigator, a TV tuner, a DVD (digital video disc) player, a set top box, a digital video recorder, a camcorder and the like, which displays the image on a screen, may be connected to the control circuit unit.

An operation and function of the vehicle inside mirror device for displaying an image according to the embodiment of the present invention having the above structure are as follows.

In a case where a vehicle is traveled backward, the camera 60 is operated for displaying an image of object placed at a rear side of the vehicle. The image data transmitted from the camera 60 is converted into the digital data through the A/D convertor 63, and the digital data is inputted to the microcontroller unit 64. The microcontroller unit 64 controls the EEPROM 66 to allow the image data to be outputted from the EEPROM, and so the image is generated in and displayed on the LCD module 50. In this case, a distance information between the vehicle and the obstacle existed at a rear side of the vehicle is displayed on the LCD module 50 together with the image to highlight the hazardous situation.

Figure 5:
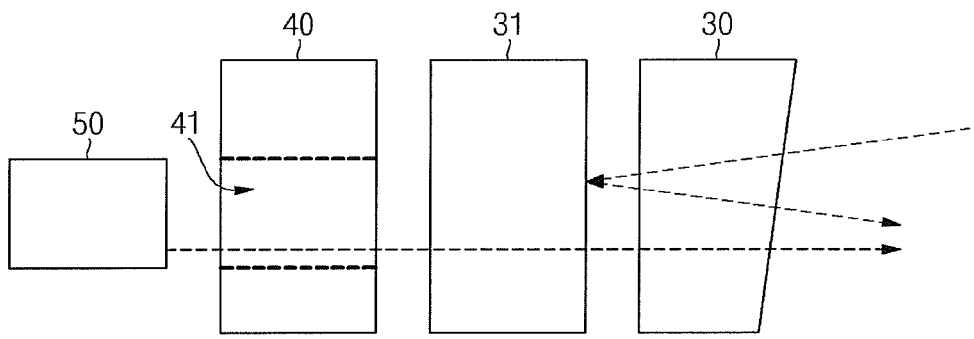
FIG. 5 is a view illustrating an image displaying principle of a vehicle inside mirror device for displaying an image according to one embodiment of the present invention.

FIG. 5 is a view illustrating an image displaying principle of a vehicle inside mirror device for displaying an image according to one embodiment of the present invention. As shown in FIG. 5, if the image is generated in and displayed on the LCD module 50. The image light of the active display passes through the opening 41 of the black film 40 and then penetrates the transflective layer 31 formed on a rear surface of the prismatic glass 30, and finally displayed on the prismatic glass 30, so that viewers, passengers in the vehicle can view the image. In this case, the incident light from an outside to the prismatic glass 30 is reflected toward outside by the transflective layer 31, and this reflected light acts as a noise.

In view of such noise, the microcontroller unit 64 calculates the luminance in the passenger compartment of the vehicle based on the signal inputted from the illumination sensor 70 and controls a brightness of the light. The light emitted from the backlight unit 65 according to the calculating result of brightness of the light emitted from the backlight unit 65 become brighter than that of the external light reflected from the transflective layer 31 and the prismatic glass 30. Consequently, although the external light image is reflected toward an outside by the transflective layer 31, the viewer can view and recognize the image generated in and displayed on the LCD module 50 and passed through the transflective layer 31.

In the meantime, in a case where the image is not generated in the LCD module 50, due to the black film 40 provided at a rear side of the transflective layer 31 formed on a rear surface of the prismatic glass 30, the prismatic glass 30 can perform the function of a mirror. At this time, since a front surface of the LCD module 50 in which the image is not generated is black colored like the black film 40, the viewer cannot recognize a difference in color between the black film 40 and the LCD module 50 exposed through the opening 41 of the black film 40.

According to the present invention as described above, a mirror function of the prismatic glass can be enhanced by providing the black film at a rear side of the prismatic glass, and a relatively simple structure of the vehicle inside mirror can be achieved by forming directly the transflective layer on a rear surface of the prismatic glass without using a substrate.

Although the preferred embodiment of the present invention has been described in detail hereinabove, the present invention is not limited thereto. In other words, it should be understood that many variations and modifications of the basic inventive concept described herein will still fall within the spirit and scope of the present invention as defined in the appended claims and their equivalents.

What is claimed is:

1. A vehicle inside mirror device for displaying an image, the vehicle inside mirror device comprising:
   a housing mounted in a passenger compartment of a vehicle;
   a prismatic glass provided on a front side of the housing and having a transparent transflective layer formed on a rear surface thereof;
   a liquid crystal display (LCD) module provided at the rear surface of the prismatic glass covering a portion of the rear surface of the prismatic glass;
   a black film provided at the rear surface of the prismatic glass and having an opening formed therein corresponding to the portion of the rear surface covered by the LCD module, the black film covering all of the rear surface not covered by the LCD module; and
   a control circuit unit installed at a rear side of the LCD module with the control circuit unit including a regulator electrically connected to a power source, an A/D convertor electrically connected to an illumination sensor and a camera, a microcontroller unit electrically connected to the A/D convertor, a backlight unit connected to the regulator and the microcontroller unit and generating backlight, an EEPROM (electrically erasable and programmable read only memory) electrically connected to the microcontroller unit, an interface connected to the EEPROM, and a LCD driver electrically connected to the interface and having an output terminal connected to the LCD module.

2. The vehicle inside mirror device for displaying an image of claim 1, further comprising a stay connected to a rear side of the housing for mounting the housing to a vehicle body.

3. The vehicle inside mirror device for displaying an image of claim 1, wherein the housing comprises a frame mounted to a front side thereof along an edge of the prismatic glass and a heat-radiating aperture formed thereon for radiating heat emitting from the LCD module and the control circuit unit to an outside thereof.

4. The vehicle inside mirror device for displaying an image of claim 1, wherein the LCD module has a front surface having a black color to remove a difference in color between the black film and the LCD module exposed through the opening of the black film.

5. The vehicle inside mirror device for displaying an image of claim 1, wherein the LCD module comprises a frame provided along an edge thereof to provide an electromagnetic interference (EMI) performance.

6. The vehicle inside mirror device for displaying an image of claim 1, wherein the micro control unit calculates the luminance in a passenger compartment of the vehicle on the basis of the signal inputted from the illumination sensor and controls a brightness of the light emitted from the backlight unit according to the calculating result to make a brightness of the light emitted from the backlight unit become brighter than that of the light reflected from the transflective layer and the prismatic glass, whereby although the external light (image) is reflected to an outside by the transflective layer, a viewer can view and recognize the image generated in and displayed on the LCD module and passed through the transflective layer.

7. The vehicle inside mirror device for displaying an image of claim 1, wherein the micro control unit controls the LCD module to display an image regarding the image data transmitted from the camera and a distance between the vehicle and an object placed at a rear side of the vehicle.

* * * * *